US 6,544,614 B1

(12) United States Patent
Huffer et al.

(10) Patent No.: US 6,544,614 B1
(45) Date of Patent: Apr. 8, 2003

(54) PACKAGING WITH INCORPORATED TEMPERATURE SENSITIVE LABEL

(75) Inventors: Scott Huffer, Lancaster, SC (US); Alicia Rudick, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 103 days.

(21) Appl. No.: 09/667,037

(22) Filed: Sep. 21, 2000

(51) Int. Cl.[7] .............................................. B32B 7/12
(52) U.S. Cl. ...................... 428/40.1; 116/200; 374/161; 374/162; 428/40.2; 428/41.3; 428/41.7; 428/42.1; 428/42.2; 428/42.3; 428/43; 428/913
(58) Field of Search ................ 428/40.1, 40.2, 428/41.3, 41.7, 42.1, 42.2, 42.3, 43, 913; 116/200; 374/161, 162

(56) References Cited

U.S. PATENT DOCUMENTS

| | | | |
|---|---|---|---|
| 2,049,867 A | 8/1936 | Richards | 40/2 |
| 2,308,087 A | 1/1943 | Lappala | 73/356 |
| 2,782,749 A | 2/1957 | Beckett et al. | 116/114 |
| 3,561,269 A | 2/1971 | Seitz | 73/356 |
| 3,782,195 A | 1/1974 | Meek et al. | 73/343 B |
| 3,835,564 A | 9/1974 | Gottschalk | 40/306 |
| 3,864,976 A | 2/1975 | Parker | 73/356 |
| 4,156,365 A | 5/1979 | Heinmets et al. | 73/343 B |
| 4,308,679 A | 1/1982 | Ray, III et al. | 40/312 |
| 4,459,046 A | 7/1984 | Spirg | 374/162 |
| 4,878,588 A | 11/1989 | Ephraim | 215/11.2 |
| 4,919,983 A | 4/1990 | Fremin | 428/35.7 |
| 5,282,683 A | 2/1994 | Brett | 374/150 |
| 5,310,261 A | 5/1994 | Blue et al. | 374/150 |
| 5,323,652 A * | 6/1994 | Parker | 73/295 |
| 5,482,373 A | 1/1996 | Hutchinson | 374/141 |
| 5,678,925 A | 10/1997 | Garmaise et al. | 374/157 |
| 5,720,555 A | 2/1998 | Elele | 374/150 |
| 5,738,442 A | 4/1998 | Paron et al. | 374/162 |
| 5,786,578 A | 7/1998 | Christy et al. | 219/720 |
| 5,871,096 A | 2/1999 | Yakich | 206/459.5 |
| 5,918,981 A | 7/1999 | Ribi | 374/162 |
| 6,222,168 B1 * | 4/2001 | Witonsky | 219/687 |
| 2001/0008238 A1 * | 7/2001 | Witonsky | 219/729 |

* cited by examiner

*Primary Examiner*—Nasser Ahmad
(74) *Attorney, Agent, or Firm*—Drinker Biddle & Reath LLP

(57) ABSTRACT

A thermally sensitive indicia releaseably incorporated into a multi-ply label is defined. The thermally sensitive indicia is incorporated between plies on a removable portion of the label. A pressure sensitive adhesive attached thereto. The thermally sensitive indicia on the removable portion can be the releaseably secured to another container to serve as a temperature sensing element.

7 Claims, 1 Drawing Sheet

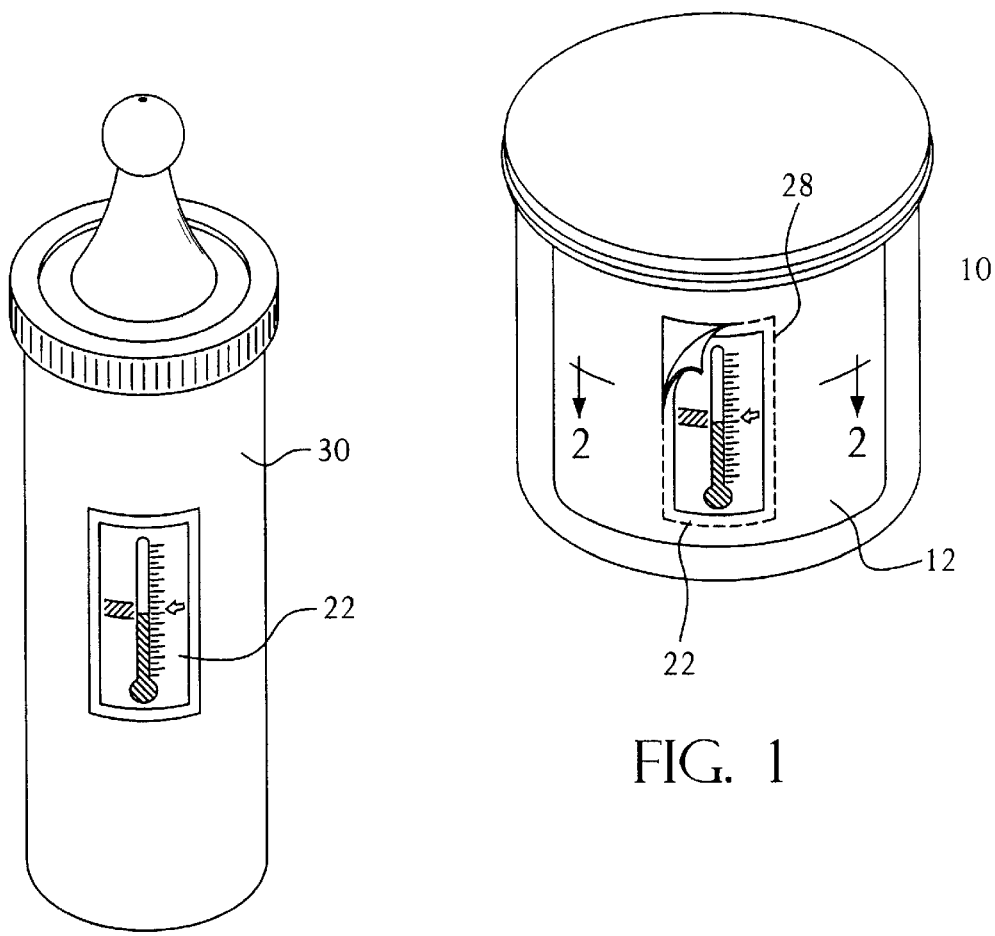
FIG. 1
FIG. 2
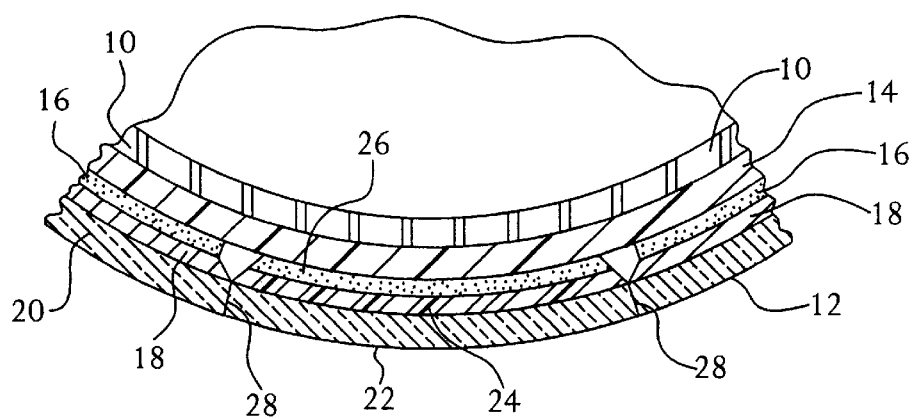
FIG. 3

US 6,544,614 B1

PACKAGING WITH INCORPORATED TEMPERATURE SENSITIVE LABEL

FIELD OF THE INVENTION

The present invention relates generally to a label for a container, package or the like which has a removable portion having a temperature sensitive indicia thereon.

BACKGROUND OF THE INVENTION

In the past, various attempts have been made to provide consumers with convenient methods of determining the temperature within a package or container. These applications have included the permanent attachment of the thermally sensitive element to the particular package or container. As such, the thermally sensitive element is not reusable or transferable.

U.S. Pat. No. 5,786,578 to Christy et al. describes a label having a thermochromatic ink temperature indicator which is attached to a microwaveable container. The label indicates temperatures which are "OK" or "TOO HOT," depending on the temperature of the contents of the container.

U.S. Pat. No. 5,918,981 to Ribi describes several uses for thermochromatic inks. One embodiment is for a label which places the letter "UN" in thermochromatic ink before the word "SAFE" in standard ink. If the temperature of the label rises above a set point, the letters "UN" become visible, signifying that the contents of the package to which the label is attached have become unacceptably hot. In another embodiment applies a stripe of thermochromatic ink to a container as a temperature indicator.

U.S. Pat. No. 3,864,976 to Parker describes an overwrap for a container. The overwrap is described as a thin plastic film onto which thermally sensitive ink has been printed.

U.S. Pat. No. 5,482,373 to Hutchinson describes the application of a thermometer to the side of a drink bottle, such as a soda can as shown in FIG. 1 or a beer bottle as shown in FIG. 3. The thermometer is shown as a label which can be purchased separately from the container whose temperature is to be monitored. The temperature sensitive element of the thermometer is described as a thermochromatic ink.

U.S. Pat. No. 2,308,087 to Lappala describes a temperature sensing label. The label is made of a clear film onto which temperature sensitive paint is applied. The clear film is then folded over onto itself to entrap the paint. Lappala describes applying the paint to form words which will then appear at a set temperature.

U.S. Pat. No. 4,878,588 to Ephraim shows a temperature indicator built into the side of a baby bottle. The temperature indicator consists of several cells of temperature sensitive liquid crystals, whose visual properties change at set temperatures.

SUMMARY OF THE INVENTION

The present invention contemplates a label for use on a package, container or the like having a thermally sensitive label or label portion which may be removed from the main body of the label to be applied to another container.

In one embodiment of the present invention, the label includes at least two plies, an outer ply and an inner ply. The interior surface of the outer ply and the outer surface of the second ply are permanently adhered to one another over a major portion thereof. A temperature sensing element is provided a one location on the outer ply. In the area of this portion of the label, the outer ply and the second ply are releaseably adhered to one another. The temperature sensing element is preferably created by a thermochromatic ink printed on the inside surface of the outer ply. A pressure sensitive reusable adhesive is provided to the interior surface of the outer ply over the thermochromatic ink.

The temperature sensing element may be defined by a series of perforations within the outer ply. This portion is removable from the inner ply of the label and the remaining portions of the outer ply. The temperature sensing element, thus, may be removed from the package or container and secured to a second container for temperature sensing. Depending on the strength and type of adhesive, the removable temperature sensing element may be repeatedly applied to various packages for sensing of the temperature of the packages or the goods therein.

BRIEF DESCRIPTION OF THE DRAWINGS

For the purpose of illustrating the invention, there is shown in the drawings a form which is presently preferred; it being understood, that this invention is not limited to the precise arrangements and instrumentalities shown.

FIG. 1 is an elevational view of the front wall and top side of a sealed package or container of the present invention.

FIG. 2 is a cross-sectional view taken along lines 2—2 of FIG. 1 showing the construction of the removable label.

FIG. 3 shows a secondary package or container having the label with the thermal indicia attached thereto.

DETAILED DESCRIPTION OF THE DRAWINGS

With reference to the drawings wherein like numerals identify like elements, there is shown in FIG. 1 a package or container. It is contemplated that a typical package for use of the present invention would be used to retain comestibles or other products. The package is generally referred to by the numeral 10. Positioned on the outer wall of the package 10 is a label 12.

As is more readily apparent from the cross section of FIG. 2, the label 12 is formed from an inner ply 14, a permanent adhesive 16 which extends over a major portion of the outer surface of the inner ply 14, an ink 18 depicting artwork and other indicia for the label 12, and an outer ply 20 which is preferably clear and covers the ink 18 and is adhered to the inner ply by the adhesive 16.

Within the label structure there is provided a separable portion 22 of the outer ply 20. The separable portion 22 of the label 12 is reverse printed with a thermochromatic type ink 24. Between the thermochromatic ink 24 and the outer surface of the inner ply 14 there is provided a pressure sensitive adhesive 26.

The separable portion 22 of the outer ply 20 of the label is defined by a series of perforations or micro-perforations 28. These perforations 28 permit the separable portion 22 to be removed from the remainder of the outer ply 22 without ripping or tearing the remaining material. The pressure sensitive adhesive 26 is contemplated to adhere to the removable portion 22 of the label and be resealable after removal. Once removed, the portion 22 becomes a temperature sensing element which may be applied on the outer surface of other containers or packages, such as a baby bottle 30 as is shown in FIG. 3. The portion of the outer ply 20 which forms the removable and resealable temperature sensing element 22 is contemplated to be made of a clear material which will permit viewing of the pattern of thermochromatic ink 24 printed on the interior surface of the ply. As illustrated, the ink pattern simulates a thermometer. It is contemplated that the various portions of the printed ink will be set to react to various temperatures, producing different colors or otherwise indicating a temperature difference as is known in the art of such inks.

When the temperature sensing element 22 is removed from the remainder of the container 10 and applied to a separate container 30 by means of the perforations 28 and the resealable adhesive 24, it may be used to indicate temperature of a secondary container or the materials in the secondary container. In the example provided, the original container 10 may retain baby formula in powder form. A portion of the contents of the container 10 may be spooned into the baby bottle 30 with the appropriate quantity of liquid material added. The bottle 30 can be heated in water or a microwave as desired. The thermal indicia on the sensing element 22 secured to the outside surface of the bottle 30 reacts to the rise in temperature of the materials in the bottle and indicates the appropriate temperature range, advising the user when it is appropriate to stop heating the bottle or to consume the liquid therein. When finished, the sensing element 22 may be removed from the bottle and used on another container as a temperature indicator. Thus, the thermal indicia operates like a removable thermochromatic sticker which is capable of indicating temperature on a number of containers.

The outer ply may be made from an oriented polypropylene, polyethylene terephthalate, or another clear polymer. The inner ply is preferably a white polyethylene film. A clear outer ply makes it possible to view, from outside the printing 18 and 24. Because the outer ply covers the thermal indicia, it is distributed to the consumer without contact between the thermal indicia and the comestibles located inside the package.

Other variations of the present invention are contemplated. Certain release agents may be used to assist in removal of the separable element. Also a tab may be created by deadening the adhesive in a corner of the separable element to assist in removal from the remainder of the removable portion.

The present invention may be embodied in other specific forms without departing from the spirit or essential attributes thereof and, accordingly, reference should be made to the appended claims, rather than to the foregoing specification, as indicating the scope of the invention.

What is claimed is:

1. A label for a container comprising:
   an outer ply having a major first portion and a distinct second portion, each portion having an exterior surface and an interior surface;
   a second ply including a first surface facing the interior surface of said outer ply portions and a second interior facing surface;
   the interior surface of the major first portion of said outer ply and the first surface of said second ply being permanently adhered to one another;
   the second portion of said outer ply releaseably adhered to the second ply and being separable from the second ply; and
   a thermochromatic ink reverse printed on the interior surface of said second portion of the outer ply.

2. The label of claim 1 wherein the releaseable portion of the outer ply further comprises a pressure sensitive resealable adhesive applied over said thermochromatic ink on the interior surface of the outer ply.

3. A label for a container comprising:
   an outer ply having an exterior surface and an interior surface;
   a second ply including a first surface facing the interior surface of said outer ply and a second interior facing surface;
   the interior surface of said outer ply and the first surface of said second ply being adhered to one another over a major portion thereof;
   a portion of said outer ply releaseably adhered to second ply and being separable from the second ply, said releaseable portion being defined by a series of perforations within the outer ply; and
   a thermochromatic ink reverse printed on the interior surface of said outer ply of said releaseable portion.

4. The label of claim 1 wherein said outer ply is made of an oriented polypropylene.

5. The label of claim 1 wherein said outer ply is polyethylene terephthalate.

6. The label of claim 1 wherein said second ply is a white polyethylene film.

7. A sealable package comprising:
   a label having
      an outer ply having a major first portion and a distinct seperable second portion, each portion having an exterior and an interior surface;
      a second ply including a first surface facing the interior surface of said outer ply and a second interior facing surface;
      the interior surface of the major first portion of said outer ply and the first surface of said second ply being permanently adhered to one another;
      the separable second portion of said outer ply being releaseably adhered to said second ply; and
      said separable second portion having a thermochromatic ink printed on its interior surface and a pressure sensitive, resealable adhesive applied over the ink.

* * * * *